April 29, 1952      H. K. MARLIN      2,594,573
CORN RAKE ATTACHMENT

Filed Nov. 9, 1949      2 SHEETS—SHEET 1

INVENTOR.
HOWARD K. MARLIN.
BY
Lockwood, Goldsmith & Galt
ATTORNEYS.

April 29, 1952  H. K. MARLIN  2,594,573
CORN RAKE ATTACHMENT
Filed Nov. 9, 1949  2 SHEETS—SHEET 2
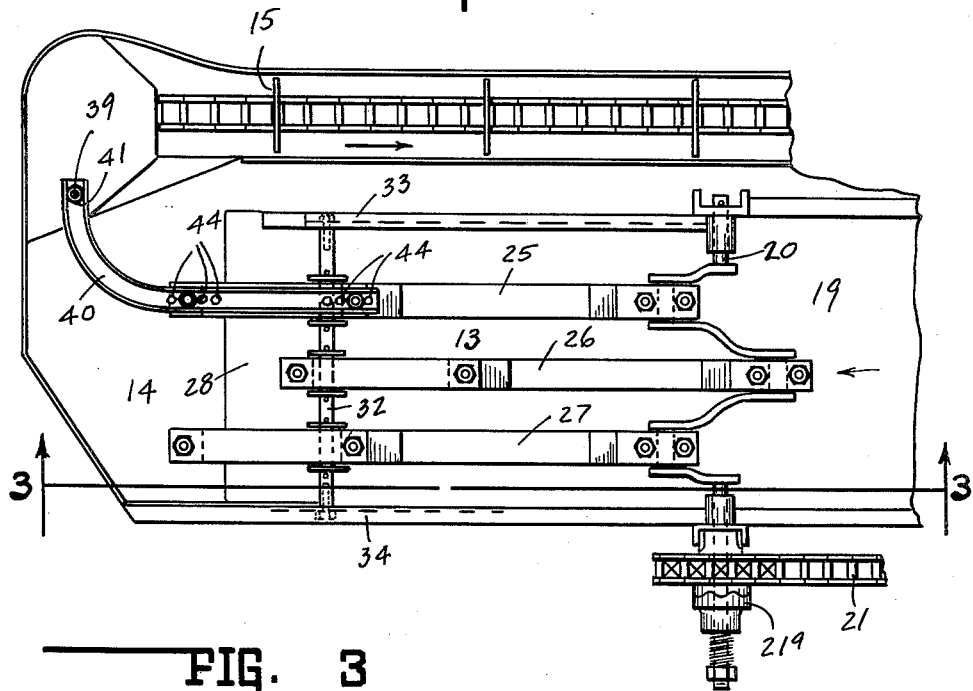
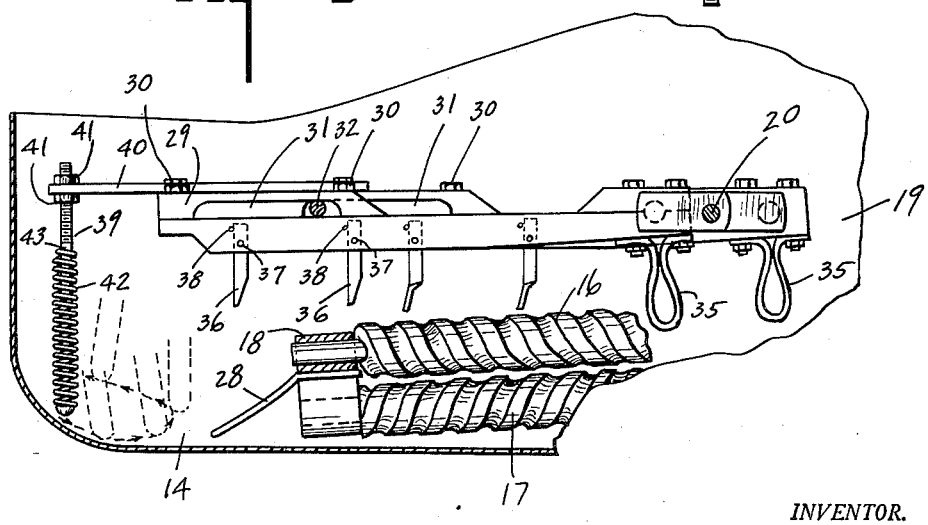
INVENTOR.
HOWARD K. MARLIN.
BY
Lockwood, Goldsmith & Galt
ATTORNEYS.

Patented Apr. 29, 1952

2,594,573

UNITED STATES PATENT OFFICE 2,594,573

CORN RAKE ATTACHMENT

Howard K. Marlin, Milroy, Ind.

Application November 9, 1949, Serial No. 126,370

2 Claims. (Cl. 130—5)

This invention relates to a husked corn rake attachment for a corn picking machine.

It is the primary object of this invention to facilitate the movement of snapped corn from the corn receiving bin through the husking bed and hopper, and into the wagon elevator of a corn picking machine.

In using the husking bed equipment of a conventional corn picker, corn delivered to the rearward end thereof from the snapped corn elevator, frequently travels approximately one-half the length of the bed before being engaged by the husking rolls. The primary reason for this resides in the helter-skelter manner in which the corn is presented to the pulling mechanism associated with the bed. By this it is meant that the corn enters the mechanism in no uniform way, some ears entering sideways and others at every conceivable angle. Consequently, in the conventional equipment, the corn as aforesaid, travels some distance along the bed before it is properly "lined up" in such a way that effective husking action can take place, and in many cases never becomes "lined up" at all, as in the case of very large ears which habitually roll crosswise the entire length of the bed.

In the present invention, on the other hand, means are provided for pulling the corn into contact with the husking rolls almost immediately after it is deposited in the corn chamber by the snapped corn elevator. This is accomplished through the provision of fingers formed of belting which are so arranged and constructed as to reach out into the chamber and pull it into engagement with the husking rolls in a properly aligned position. As a consequence, the husking action of the rolls is effective throughout their entire length, and a cleaner husking job is performed.

It is a characteristic of the conventional husking bed equipment that the corn moves relatively slowly therethrough even after it has come into contact with the husking rolls. In order to overcome this disadvantage, it has heretofore been customary to cause the rolls to rotate at a rapid rate of speed. While this does speed up the rate of travel of the ears, it is attended by the unsatisfactory tendency on the part of the rubber rolls to smoke and burn because of the heat generated by the friction between the ears of corn and the rolls. Furthermore, rapid rotation causes the ears to be cast to one side of the husking bed in the direction of rotation of the rolls. This fact results in an unusual amount of wear upon the outside roll, which because it is generally made of a rubber composition soon has to be replaced.

It is a further object of the present invention to provide means for urging and impelling the corn forwardly along the husking bed while it is being husked. This is accomplished through the provision of pivoted finger elements which are adapted to engage the corn during the forward movement of the attachment and urge it towards the hopper, and yet which pivot free of corn urging position during the return stroke of such attachment. As an alternative, the connecting rods comprising a part of the attachment may themselves be arranged to engage the corn during their forward movement for the purpose of urging it along the husking bed towards the hopper.

It is a still further object of this invention to provide means for preventing the "piling up" and "clogging" of corn in the hopper at the forward end of the husking bed so that it can make with greater facility the turn of approximately 180° into the wagon elevator. Heretofore, there has existed no satisfactory means for overcoming this difficulty. In the present invention, however, an agitator arm is provided to continuously force the corn around the bend and into the elevator.

It is a still further object of this invention to provide sufficient clearance between the ears of corn and the rake attachment overlying them so that the ears may assume any angle which efficient stripping of the husks may require. In the standard husking bed equipment on the other hand there is insufficient space provided for this purpose.

The full nature of the invention will be understood from the accompanying drawings and the following description and claims.

Fig. 2 is a top plan view thereof.

Fig. 3 is a section view taken on lines 3—3 of Fig. 2.

Figure 1:
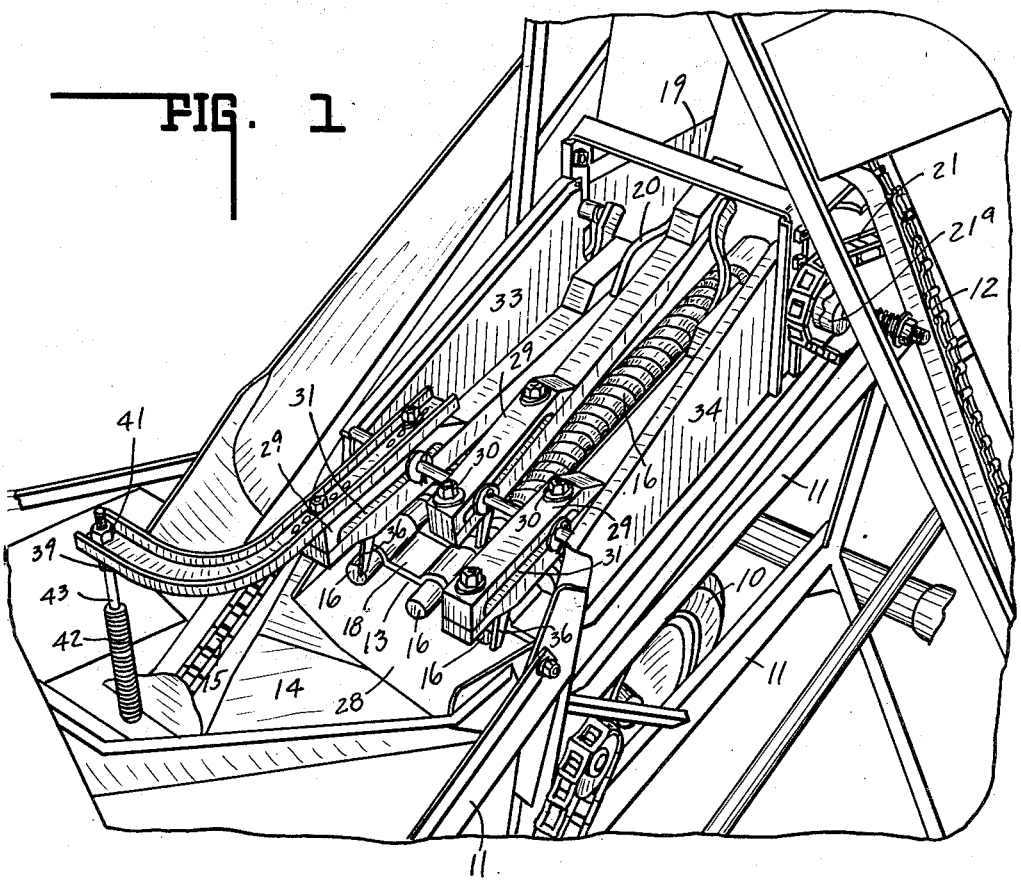
Fig. 1 is a perspective view of the invention mounted in the husking bed of a corn picker.

In the drawings 10 shows the wheel of a conventional corn picker having the usual frame 11, a snapped corn elevator 12, a husking bed indicated generally at 13, a hopper 14, and a wagon elevator 15.

The husking bed equipment of such a corn picker comprises two series of rotating husking rolls, 16 and 17 respectively, there generally being three rolls in each series. The individual rolls of each series are disposed alternately with those of the other series, there being provided a slight space therebetween to permit the husks that are stripped from the corn by the action of the rolls, to be discharged downwardly therethrough. The rolls of both series are mounted adjacent their extremities in bearing plates, one of which is shown at 18. In the standard corn picker, one series of rolls 16 is preferably formed of a resilient material such as rubber, while the other is formed of a material such as steel or the like. The latter series is offset downwardly relative to the former thereby forming a channel or passageway along which the corn travels from the chamber 19, where the corn is delivered from the snapped corn elevator, to the hopper 14. It is to be understood that the above mechanism does not in and by itself form the invention, it being part of the standard corn picking unit sold on the open market.

The invention itself consists of a rake attachment which is designed for use with a standard corn picking unit. The attachment includes the crankshaft 20 driven by the sprocket chain 21 having a slip clutch 21a associated therewith. The crankshaft has three angularly disposed crank portions formed therein, and to each portion there is secured, adjacent its rearward end, a connecting rod 25, 26 and 27. The connecting rods are so arranged that one of them overlies each channel or passageway, there being sufficient space provided between the underneath portion of the rods and the bottom of the channel to accommodate the corn engaging fingers hereinafter mentioned. In the event the fingers are not employed as a part of the construction, the rods will be so spaced from the channels that they engage the corn and urge it forwardly during the forward movement of the rods.

The length of the connecting rods is such that when they are in their rearwardmost swinging position, they overlie a portion of the chamber into which the corn is deposited by the snapped corn elevator. On the other hand, when in their forwardmost position, the arms overlie the apron 28 leading into the hopper 14.

The forward portion of each rod has a built up section 29 secured thereto in any satisfactory manner as by the bolts 30. The lower surface of each section is dished out intermediate its ends so that a longitudinally disposed slot 31 is formed when the sections are secured to the rods. Extending transversely of the husking bed, and through the slots thus formed is the stationary bar 32 which is secured at opposite ends to the side walls 33 and 34 that define the width of the bed, and which forms a pin and slot connection with said rods.

The rotary motion imparted to the rearward portion of each connecting rod by the crankshaft is translated into a to and fro elliptical motion at the forward ends of the rods by reason of the pin and slot connection.

Directly under the point of attachment of each rod to the crank portion there may be secured a self-adjusting finger 35 formed preferably of looped belting and so arranged that it is just free of contact with the husking rolls when the crank portion is at the lowest point of its circular movement. By reason of its flexibility, each finger bends backwards to pass over ears of corn which are travelling along the channels when the rods are in the fro portion of their to and fro motion. Yet at the same time each finger exerts a downward pressure on the ears thereby forcing them into contact with the rolls so that the husks can be easily caught and stripped therefrom.

Each of the abovementioned fingers is so mounted that it extends a slight distance into the area defining the chamber 19 during the down stroke of the crank portion. Since the rotation of the connecting rod is clockwise, looking into the husking bed from the right-hand side of Fig. 1, it follows that each finger reaches back intermittently into the chamber and begins pulling the corn into engagement with the rolls during the to portion of the to and fro swinging movement of the rod. As a result, the corn is immediately pulled into husking position instead of being permitted to drift slowly into that position as happens in the standard equipment.

After the corn is thus pulled into the husking rolls, its forward travel is facilitated not only by the action of the rotating rolls as in the standard equipment, but by the forward movement of the connecting rods themselves. Once the rods have reached their forwardmost position, they reciprocate rearwardly and upwardly thereby freeing themselves from engagement with corn already travelling along the channels, preparatory to performing the same action in the cycle that has been described above, namely reaching into the chamber through the medium of the belting and pulling the corn into engagement with the husking rolls.

In order to keep the ears moving along the channels towards the hopper, there are provided additional fingers 36 which urge the corn forwardly after it has reached a point in the husking bed where the flexible fingers no longer contact it. These fingers 36 are preferably formed of a rigid material and are pivotally mounted underneath each connecting rod at 37 in a position overlying the channels. A stop pin 38 is carried by the rod adjacent to the pivotal mounting but forwardly and upwardly therefrom. As a consequence of this arrangement, the fingers urge the corn forwardly during the to movement of the rod, and are stopped from pivoting rearwardly out of corn urging position. On the other hand, the fingers are free to swing upwardly and clear the corn during the fro movement of the rod.

The movement of the corn along the husking bed is thus constantly facilitated until it falls into the hopper where its direction of travel must be changed by 180° so that it can be carried up the wagon elevator. In the standard equipment, the corn clogs and piles up in the hopper by reason of the change of direction required. In order to eliminate this disadvantage, there is provided an agitator arm shown generally at 39 which depends downwardly from a curved support member 40 secured by the nuts 41 to that connecting rod which is nearest the wagon elevator. The agitator arm is shown in the drawings as comprising a heavy coil spring 42 secured to the rod 43, the upper end of which is threaded in order that it may be adjusted vertically relative to the support member.

When the connecting rod to which the support member is secured is moving forwardly in the to portion of its to and fro motion, the agitator arm is at its highest or corn clearance position. On the other hand, when the connecting rod is in the fro portion of its motion, the agitator swings downwardly and rearwardly with a reverse raking action, thereby moving the corn forcibly around the bend and directly into the wagon elevator. This operation effectively does away with all clogging in the hopper.

In order to vary the distance at which the agitator arm extends forwardly of the connecting rod and into the hopper, a series of apertures 44 is formed in spaced relation longitudinally of the support arm. It is thus possible to shift the support arm and the agitator arm secured thereto, either forwards or backwards the desired distance.

In operation, the corn is delivered to the chamber by the snapped corn elevator. From thence it is pulled by the action of the flexible fingers into contact with the husking rolls. The forward swing of the connecting rods is such that the corn is contacted and urged forwardly thereby. This is in addition to the forward motion imparted to the corn by the flexible fingers and by the husking rolls themselves. Once the corn has passed the point in the husking bed where it is engaged by the flexible fingers, it is urged forwardly by the pivoted fingers until it reaches the hopper. Once in the hopper, the 180° turn of the corn into the wagon elevator is facilitated by the reverse raking action of the agitator arm.

While the invention has been described in great detail, it is to be understood that not only the embodiments described but those which will readily suggest themselves to persons skilled in this art, are all considered to be within the broad scope of the invention.

The invention claimed is:

1. In a corn picking machine having a husking bed, a snapped corn chamber positioned rearwardly thereof, a hopper positioned forwardly of said bed, a wagon elevator disposed laterally of said hopper and communicating therewith, and a series of husking rolls rotatably mounted in said bed and positioned longitudinally thereof; a corn rake attachment comprising a plurality of elongated corn moving members disposed in vertical spaced relation to said rolls and being substantially parallel thereto, said members having an elongated slot formed adjacent their forward ends, driving means for said members including a crank shaft having a plurality of angularly disposed crank portions, each of said members being connected adjacent its rearward end to a crank portion whereby a to and fro swinging motion is imparted to said members, a rod disposed transversely of said bed adjacent said hopper and extending through said slots for translating the rotary motion imparted to the rearward ends of said members into an elliptical motion at the forward ends thereof, and means for urging corn in said hopper towards said elevator during the fro portion of said to and fro motion, said last mentioned means comprising a bar connected to one of said elongated members and extending angularly forwardly thereof into the area defined by said hopper, and a resilient element depending from the forward end of said bar and being operably associated with corn in said hopper during said fro portion of the to and fro motion of said elongated members.

2. In a corn picking machine including a husking bed, a snapped corn chamber positioned rearwardly thereof, a hopper positioned forwardly of said bed, a wagon elevator disposed laterally of said hopper and communicating therewith, and a series of husking rolls rotatably mounted in said bed and positioned longitudinally thereof; a corn rake attachment comprising a plurality of elongated corn moving members disposed in vertical spaced relation to said rolls, rotary driving means connected adjacent the rear ends of said members for imparting a to and fro swinging motion thereto whereby corn on said rollers is moved forwardly towards said hopper during the to portion of said to and fro motion, means extending transversely of said bed in vertical spaced relation thereto and having a pin and slot connection with the forward ends of said elongated members for translating the rotary motion imparted to the rear ends of said members into an elliptical motion at the forward ends thereof, and means for urging corn in said hopper towards said wagon elevator during the fro portion of said to and fro motion, said last mentioned means comprising a bar connected to that member nearest said wagon elevator and extending angularly forwardly thereof into the area defined by said hopper, and an element including resilient means depending from the forward end of said bar and being operably associated with corn in said hopper during said fro portion of said to and fro motion of said members, said element having vertically adjustable means for varying the distance which it depends from said bar.

HOWARD K. MARLIN.

REFERENCES CITED

The following references are of record in the file of this patent:

UNITED STATES PATENTS

| Number | Name | Date |
|---|---|---|
| 568,981 | Janney | Oct. 6, 1896 |
| 742,387 | Bort | Oct. 27, 1903 |
| 759,725 | Martindale | May 10, 1904 |
| 1,458,721 | Nelson | June 12, 1923 |
| 1,536,887 | Kurtenbach | May 5, 1925 |